United States Patent
Stanczyk et al.

(10) Patent No.: US 12,493,928 B2
(45) Date of Patent: Dec. 9, 2025

(54) AUTOMATIC IMAGE TREATMENT SUGGESTIONS BASED ON COLOR ANALYSIS

(71) Applicant: Apple Inc., Cupertino, CA (US)

(72) Inventors: Piotr J. Stanczyk, San Francisco, CA (US); Etienne Guerard, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 320 days.

(21) Appl. No.: 18/327,403

(22) Filed: Jun. 1, 2023

(65) Prior Publication Data

US 2023/0394638 A1 Dec. 7, 2023

Related U.S. Application Data

(60) Provisional application No. 63/365,838, filed on Jun. 3, 2022.

(51) Int. Cl.
*G06T 5/40* (2006.01)
*G06T 7/10* (2017.01)

(52) U.S. Cl.
CPC .............. *G06T 5/40* (2013.01); *G06T 7/10* (2017.01); *G06T 2207/20024* (2013.01)

(58) Field of Classification Search
CPC .................. G06T 7/00–97; G06T 5/00–94
See application file for complete search history.

(56) References Cited

U.S. PATENT DOCUMENTS

| | | | | |
|---|---|---|---|---|
| 2003/0099407 A1* | 5/2003 | Matsushima | .......... | H04N 23/76 348/E5.119 |
| 2005/0008193 A1* | 1/2005 | Toyama | .................... | G06T 7/20 382/103 |
| 2005/0052446 A1* | 3/2005 | Plut | ........................ | G06F 1/3218 345/211 |
| 2006/0221090 A1* | 10/2006 | Takeshima | .............. | G06T 7/194 345/582 |
| 2007/0002035 A1* | 1/2007 | Plut | ........................ | G06F 1/3265 345/211 |
| 2010/0027072 A1* | 2/2010 | Enjuji | ........................ | G06T 5/40 358/3.01 |
| 2011/0109620 A1* | 5/2011 | Hong | .................... | G06T 11/001 382/167 |

(Continued)

*Primary Examiner* — Sean T Motsinger
(74) *Attorney, Agent, or Firm* — Blank Rome LLP

(57) ABSTRACT

A method of image processing is disclosed herein, the method comprising: obtaining a first image comprising a first plurality of pixels; obtaining a first segmentation map for the first image, wherein the first segmentation map comprises a first plurality of segmentation values; performing a histogram analysis on the first plurality of pixels, wherein the histogram analysis is weighted based on each pixel's corresponding segmentation value in the first segmentation map, and wherein the histogram analysis comprises determining at least: (a) a median luminance value for pixels that are estimated (e.g., based on their segmentation values) to be part of the background of the first image; and (b) one or more dominant hues for pixels estimated to be part of the background of the first image; and suggesting a first image treatment for the first image based on the determined median luminance value and/or the determined one or more dominant hues.

12 Claims, 4 Drawing Sheets

(56) References Cited

U.S. PATENT DOCUMENTS

| | | | |
|---|---|---|---|
| 2013/0163858 A1* | 6/2013 | Kim | G06T 7/74 |
| | | | 382/156 |
| 2013/0177239 A1* | 7/2013 | Ueda | G06T 7/11 |
| | | | 382/165 |
| 2015/0116353 A1* | 4/2015 | Miura | G02B 27/0075 |
| | | | 345/632 |
| 2017/0098136 A1* | 4/2017 | Kobayashi | G06V 10/56 |
| 2018/0089810 A1* | 3/2018 | Hirai | G06T 5/90 |
| 2018/0108137 A1* | 4/2018 | Price | G06N 3/045 |
| 2019/0139228 A1* | 5/2019 | Park | G06T 7/143 |
| 2023/0394638 A1* | 12/2023 | Stanczyk | G06T 5/40 |

* cited by examiner

AUTOMATIC IMAGE TREATMENT SUGGESTIONS BASED ON COLOR ANALYSIS

TECHNICAL FIELD

This disclosure relates generally to the field of digital image processing. More particularly, but not by way of limitation, it relates to techniques for automatically suggesting image treatment options based on image color analysis techniques.

BACKGROUND

Image treatments, as used herein, may refer to any one or more of color-related, brightness-related, saturation-related, hue-related, chroma-related, or other pixel manipulation techniques that may be applied to image pixels for any number of aesthetic (or non-aesthetic) reasons. For example, in some instances, users may wish to apply aesthetically-pleasing image treatment operations to images that may later be used as a wallpaper image, photo album cover photo, avatar, profile photo, or the like. Thus, it would be beneficial if there existed intelligent systems that could automatically suggest aesthetically-pleasing image treatment options for a user's images based, at least in part, on a color analysis of said images.

SUMMARY

In accordance with one or more aspects, a method of image processing is disclosed, comprising: obtaining a first image comprising a first plurality of pixels, wherein each pixel in the first plurality of pixels is represented by one or more pixel values; obtaining a first segmentation map for the first image, wherein the first segmentation map comprises a first plurality of segmentation values, wherein each segmentation value in the first plurality of segmentation values represents to a degree to which a corresponding pixel in the first plurality of pixels is estimated to be part of a background of the first image; performing a histogram analysis on the first plurality of pixels, wherein the histogram analysis is weighted based on each pixel's corresponding segmentation value in the first segmentation map, and wherein the histogram analysis comprises determining at least: (a) a median luminance value for pixels estimated to be part of the background of the first image; and (b) one or more dominant hues for pixels estimated to be part of the background of the first image; and suggesting a first image treatment for the first image based, at least in part, on the determined median luminance value or the determined one or more dominant hues.

According to some aspects, suggesting the first image treatment for the first image further comprises: filtering the pixel values of the first plurality of pixels around the determined one or more dominant hues.

According to other aspects, suggesting the first image treatment for the first image further comprises: extracting one or more median luminance values from a red-green-blue (RGB) image histogram constructed based on the filtered pixel values of the first plurality of pixels.

According to some such aspects, suggesting the first image treatment for the first image further comprises: suggesting a set of complimentary colors for use in the application of the first image treatment, wherein the set of complimentary colors are determined based, at least in part, on the extracted one or more median luminance values from the RGB image histogram.

According to other such aspects, suggesting the first image treatment for the first image further comprises: suggesting a brightness treatment for the pixels estimated to be part of the background of the first image based, at least in part, on the determined median luminance value for the pixels estimated to be part of the background of the first image.

The various methods and techniques summarized in this section may likewise be performed by an electronic device, which may comprise one or more image capture devices, such as optical image sensors/camera units; a display; a user interface; one or more processors; and a memory coupled to the one or more processors; wherein the one or more processors are configured to perform any of the various methods and techniques summarized herein. The various methods and techniques summarized in this section may likewise be stored as instructions in a non-transitory computer-readable medium, wherein the instructions, when executed, cause the performance of the various methods and techniques summarized herein.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF DRAWINGS

A better understanding of the present subject matter may be obtained when the following detailed description of various aspects is considered in conjunction with the following drawings.

DETAILED DESCRIPTION

Figure 1:
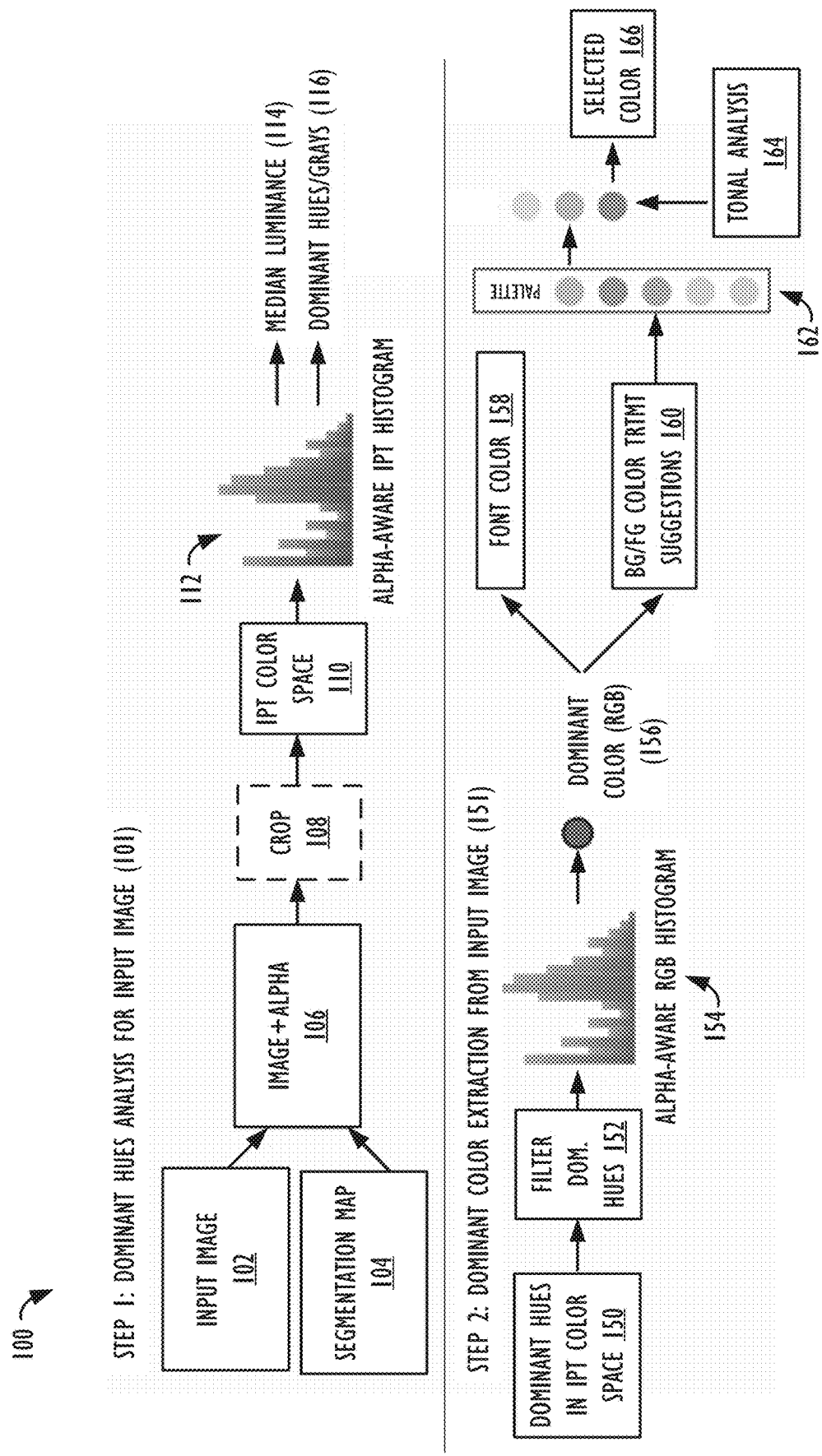
FIG. 1 illustrates a pair of exemplary image processing pipelines for performing dominant hue image analysis, according to some aspects.

Turning now to FIG. 1, a pair of exemplary image processing pipelines 100 are shown. In particular, image processing pipeline 101 shows a dominant hues analysis image processing pipeline that may be performed on an input image 102 and the input image 102's corresponding segmentation map 104. In some embodiments, the input image 102 may comprise pixels each having one or more pixel values, e.g., RGB values, YCbCr values, or the like.

In some embodiments, the segmentation map 104 comprises a first plurality of segmentation values, wherein each segmentation value in the first plurality of segmentation values represents to a degree to which a corresponding pixel in the first plurality of pixels is estimated to be part of a background of the first image. It is to be understood that the use of background/foreground segmentation here is merely exemplary, and that other segmentation classes may be used. Moreover, in other embodiments, the segmentation values could alternatively reflect a degree to which each pixel is estimated to be part of the image's foreground, too. In some embodiments, the segmentation map 104's segmentation values will be referred to herein as "alpha" values, i.e., a continuous decimal value, e.g., in the range 0 . . . 1, wherein the a value of 0 represents a full confidence that a pixel belongs to the image's background, and a value of 1 represents a full confidence that a pixel belongs to the image's foreground, and values between 0 and 1 represent respective relative confidences, with values closer and closer to 0 reflecting more and more certainty in the segmentation map that a particular pixel belongs to the image's background. Other sign conventions and data representations in the segmentation map 104 are also possible. However, as will be discussed herein, use of an alpha value in the segmentation map may provide for the convenient ability to "weight" the influence of certain pixels in the image analysis stages of the image processing pipeline, e.g., based on the degree to which a given pixel in the image is estimated to be a part of the background (or foreground, if that is what is relevant to a particular image treatment being suggested) of the input image. In some cases, if there is too much uncertainty in an image's segmentation map 104 (e.g., a large number of pixels with values close to 0.5), the image may simply not be recommended for use with the image treatment operations described herein.

At block 106, the input image and its corresponding alpha values form the segmentation map 104 may be combined. Then, at block 108, a cropping operation may be applied to the input image 102, e.g., if it is desirable to use and/or perform analysis on only a subset of the input image 102's pixels (or, e.g., if a certain size or aspect ratio is desired for the treated image). At block 110, the input image data may be converted (if necessary) into a perceptual color space, e.g., the IPT, ICtCp, or ITP color spaces, i.e., a color space that is able to represent pixels in terms of hue-chroma-luminance (i.e., "HCL").

At block 112, an alpha-aware histogram may be constructed for the input image 102 in perceptual, e.g., IPT, color space. In some embodiments, the alpha-aware histogram 112 may divide up the input image pixels into discrete "buckets" in hue space. As alluded to above, the use of an alpha-aware histogram allows the ability to "weight" the influence of certain pixels in the image analysis stage. For example, if the exemplary image treatment in FIG. 1 operates on background pixels, then the weight or influence of image pixels in the foreground may be decreased, e.g., based on the degree to which the given pixels are estimated to be a part of the foreground of the input image. In this way, rather than having their values set to '0' or some other constant value in the hue histogram 112 (which would throw off any subsequent dominant color analysis), such pixels may simply be wholly (or partially) disregarded from the image analysis altogether, i.e., in accordance with their respective segmentation map values.

In some embodiments, the histogram 112 may also comprise a special, so-called "filtered hue" channel, which may, e.g., represent only the image hue values for which the corresponding image chroma value is also at least above a threshold value, e.g., 25%. A filtered hue may be beneficial since the notion of hue is essentially undefined/meaningless for pixels having chroma values below a certain threshold. If low chroma pixels are included in the hue histogram analysis, there is a chance the dominant hues will be biased towards a hue(s) that are not really present in the input image.

In some embodiments, at least a median luminance value (114) and one or more dominant hues values (116) may be determined for pixels estimated to be part of the background of the first image. In some such embodiments, the one or more dominant hues values (116) may be determined as any sufficiently large local maxima peaks in the hue histogram 112. In some instances, special consideration may be taken for hue peaks or ranges that may span above 360 degrees and back around to 0 degrees (i.e., taking into consideration that hue values form a continuous circle, rather than being purely ascending in value, as in a typical histogram).

Turning now to image processing pipeline 151, a dominant color extraction image processing pipeline that may be performed on determined dominant hue values for an input image is shown. First, at block 150, the one or more dominant hues values (e.g., as determined 116), e.g., as represented in IPT (i.e., hue-chroma-luminance) color space by be obtained. Next, at block 152, the pixels in the input image may be filtered around the determined one or more dominant hues. According to some embodiments, a tent filter (e.g., a tent filter that is 15-, 30-, or 45-degrees wide) may be applied to the image data in hue space (i.e., rather than a box filter or other type of filter). In this way, the farther away in hue that a pixel gets from one of the determined one or more dominant hues, the less weight it will get in the dominant color extraction operations of image processing pipeline 151.

At block 154, an alpha-aware histogram may be constructed for the input image 102 in red-green-blue (RGB), color space. In some embodiments, the RGB image histogram may be constructed based on the filtered pixel values of the first plurality of pixels determined at block 152. In this way, the dominant color(s) ultimately extract from the input image will be based on the determined dominant hues in the image, but the actual color extracted will come from the image itself, and thus provide a better match in terms of tonality and saturation to the actual image.

In some embodiments, the alpha-aware RGB histogram 154 may divide up the input image pixels into discrete "buckets" in each of one or more channels of RGB space (e.g., a red histogram, a green histogram, a blue histogram, and even a pure luminance histogram). As alluded to above, the use of an alpha-aware histogram allows the ability to "weight" the influence of certain pixels in the image analysis stage. For example, if the exemplary image treatment in FIG. 1 operates on background pixels, then the weight or influence of image pixels in the foreground may be decreased, e.g., based on the degree to which the given pixels are estimated to be a part of the foreground of the input image. In this way, rather than having their values set to '0' or some other constant value in the RGB histogram 154, such as black (which would throw off any subsequent dominant color analysis), such pixels may simply be wholly (or partially) disregarded from the image analysis altogether, i.e., in accordance with their respective segmentation map values.

According to some embodiments, for each image channel for which a filtered RGB histogram has been constructed, a median value may be determined and then, e.g., the median red value, median green value, and median blue value may be combined to form the dominant RGB color (156) for the input image 102. Other techniques in addition to selecting the median value from each histogram may also be used, but the medians tend to give aesthetically-pleasing dominant color determinations, based on experimental results.

Next, using the determined dominant RGB color (156), one or more automatic suggestions may be offered to a user. For example, a complimentary font color (158), e.g., to be overlaid in the form of text over input image 102, may be suggested to the user based on the determined dominant RGB color (156). In other embodiments, various background (and/or foreground-related) color treatment suggestions may be automatically suggested to the user, e.g., as seeded by the determined dominant RGB color (156) and/or a palette (162) of curated (or mathematically determined) colors that are complimentary to the determined dominant RGB color (156). Ins some cases, complimentary colors may be determined based, at least in part, one or more median luminance values extracted from an RGB image histogram.

In some embodiments, a tonal analysis (164) may also be performed on the input image, e.g., based, at least in part, on an estimated median luminance value for the relevant pixels in the input image. For example, for an image treatment configured to operate on background pixels in the image, the tonal analysis (164) may suggest a brightness treatment for the pixels estimated to be part of the background of the input image based, at least in part, on a determined median luminance value for the pixels estimated to be part of the background of the input image. In the example of FIG. 1, this may comprise suggesting: a bright, a dark, or a neutral version of the determined dominant RGB color (156) for use in the application of the selected image treatment. Finally, the user may select a preferred color (166), e.g., from the palette 162, from which to seed and apply the selected image treatment. For example, in some treatments, selected color 166 may be applied to or used to tint (or replace certain colors in) the background (and/or foreground) of the input image. In other treatments, selected color 166 and another complimentary color may be applied to the input image in an aesthetically-pleasing fashion to provide a "dual tone" look to the treated version of the input image. In still other examples, areas of the input image other than those sufficiently close to the determined dominant RGB color (156) may be converted to grayscale, or made more monochromatic, etc.

Figure 2:
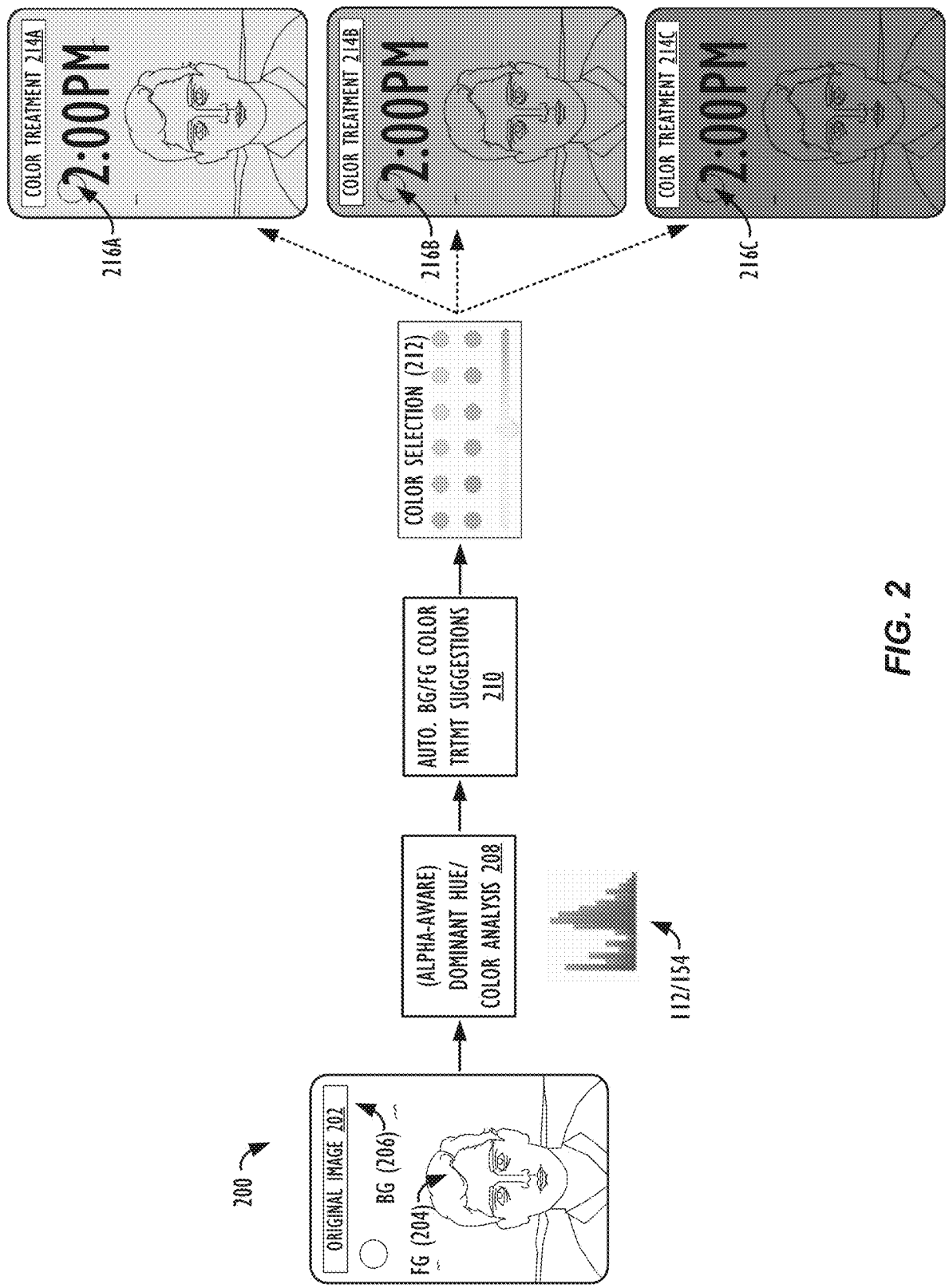
FIG. 2 illustrates an exemplary application of an automatically-suggested image treatment to an original image, according to some aspects.

Turning now to FIG. 2, an exemplary application 200 of an automatically-suggested image treatment to an original image 202 is shown. As discussed above, in some embodiments, image 202 may be segmentable into foreground (204) and background (206) regions, e.g., via the aid of a segmentation map (e.g., segmentation map 104). In this example, an image treatment is shown that appears to affect both the image foreground and background in the same manner, though it is to be understood that a given image treatment could, of course, be configured to target only image foreground pixels, only image background pixels, or desired subsets thereof.

As described above with reference to FIG. 1, in some embodiments, at block 208, an alpha-aware dominant hue/color analysis and extraction operation may be performed (e.g., involving the use of histograms similar to histograms 112/154 described above), which may produce the determination of one or more dominant RGB colors in the original image 202. Based on the analysis performed at block 208, at block 210, one or more automatic color treatment suggestions may be presented to a user for selection (e.g., such as the aforementioned color treatment examples, which may specifically target background pixels and/or foreground pixels in an input image in unique and/or independent ways to present aesthetically-pleasing results).

According to some embodiments, at block 212, a color selection palette may then be presented to a user which may, e.g., present one or more of the determined dominant RGB colors and/or one or more colors determined to be complimentary to one of the determined dominant RGB colors in the image, as well as a slider (or other user interface element), which may allow a user to apply a particular tonality or brightness treatment to a selected color. For example, as shown at block 212, sliding the slider to the left may select a brighter version of the dominant color, while sliding the slider to the right may select a darker version of the dominant color. As described above, in some embodiments, a default slider/brightness treatment value may be automatically suggested to the user, e.g., based on a median luminance analysis (or other form of brightness analysis) on the original image 202.

Finally, based on the particular image treatment and color (and/or brightness) values selected by the user at blocks 210 and 212, various versions of the original image 202 may be produced. For example, color treatment variant 214A may represent a "bright color wash" effect that is based on the determined dominant RGB color of the original image 202 being applied to the foreground and background of the image (though, as noted, in other examples, the effect may be applied exclusively to the background or exclusively to the foreground, etc., as is desired), while color treatment variant 214B may represent a "neutral color wash" effect being applied to original image 202, and color treatment variant 214C may represent a "dark color wash" effect being applied to original image 202.

As mentioned above, in some embodiments, a font color may also be selected for textual elements (e.g., 216A/216B/216C) to be included in the treated version 214 of the original image 202. In some embodiments, the selected font color may also be determined based on one of the determined dominant colors in the original image (or determined to be complimentary to one of the determined dominant colors in the original image). In some image treatments, e.g., those for which there is a foreground/background segmentation map provided for the original image, the textual elements may be inserted into the treated version 214 of the original image 202 at a depth that is "between" the image's background and foreground. For example, in the case of FIG. 2, the time (2:00 PM) in the treated versions 214 of the original image 202 may cover and occlude certain background elements of the image (e.g., the Sun), but would appear "behind" (i.e., be occluded by) certain foreground elements of the image (e.g., the face of the human subject in the image).

In some embodiments, the image treatments that are suggested to a user will be those that are configured and/or estimated to create the least visually and/or aesthetically-unpleasing artifacts when applied to the original input image. In some embodiments, other compositing techniques, such as edge softening and/or spill suppression may also be applied, so as to attempt to limit aesthetically-unpleasing artifacts in the treated image.

Figure 3:
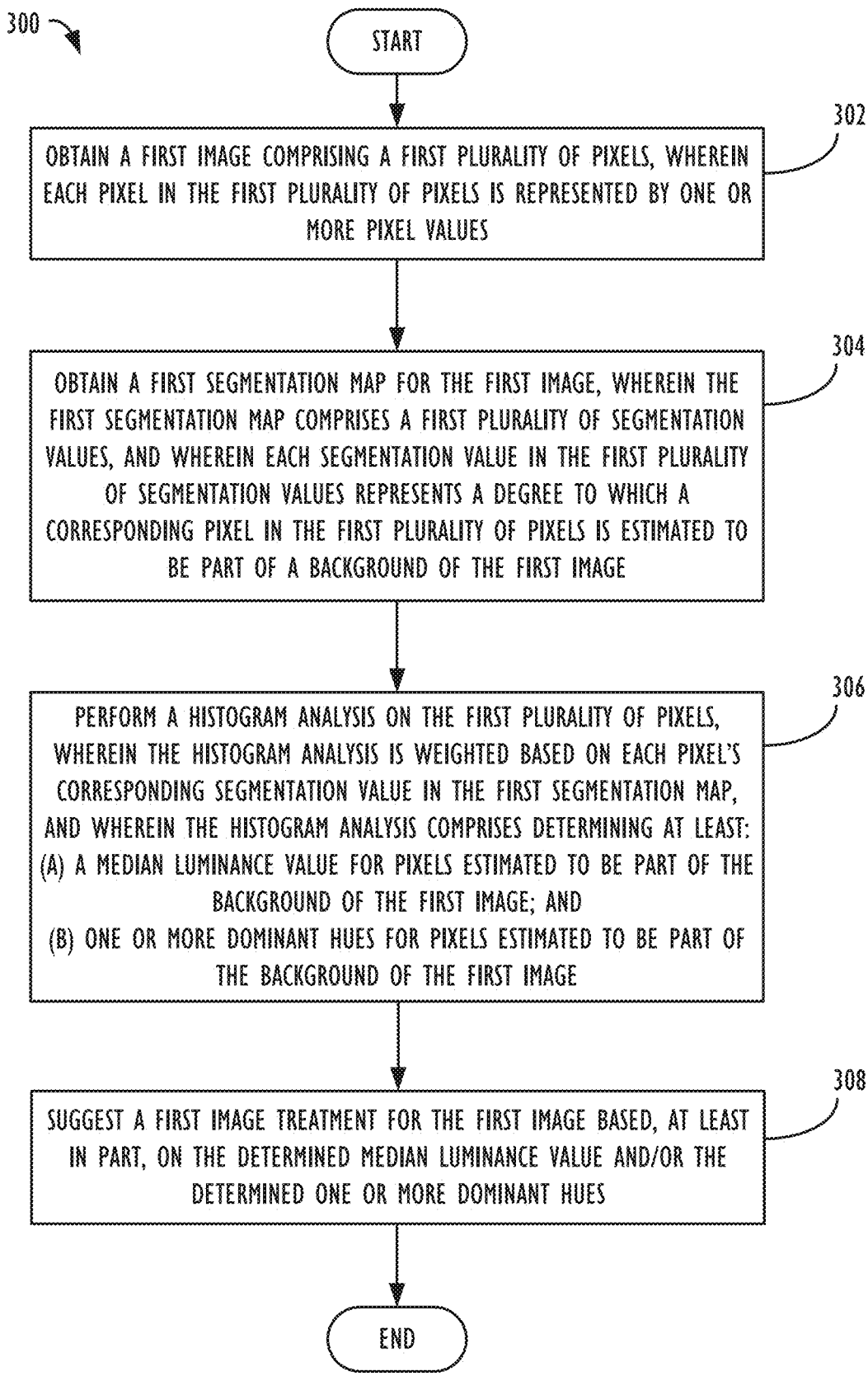
FIG. 3 is a flowchart detailing a method of performing a dominant hues image processing analysis, according to some aspects.

Turning now to FIG. 3, a flowchart is shown, detailing a method 300 of performing a dominant hues image processing analysis. First, at step 302, the method 300 may obtain a first image comprising a first plurality of pixels, wherein each pixel in the first plurality of pixels is represented by one or more pixel values. Next, at step 304, the method 300 may obtain a first segmentation map for the first image, wherein the first segmentation map comprises a first plurality of segmentation values, and wherein each segmentation value in the first plurality of segmentation values represents a degree to which a corresponding pixel in the first plurality of pixels is estimated to be part of a background of the first image. Next, at step 306, the method 300 may perform a histogram analysis on the first plurality of pixels, wherein the histogram analysis is weighted based on each pixel's corresponding segmentation value in the first segmentation map. In some embodiments, the histogram analysis may comprise determining at least: (a) a median luminance value for pixels estimated to be part of the background of the first image; and (b) one or more dominant hues for pixels estimated to be part of the background of the first image. Finally, at step 308, the method 300 may suggest a first image treatment for the first image based, at least in part, on the determined median luminance value and/or the determined one or more dominant hues.

Figure 4:
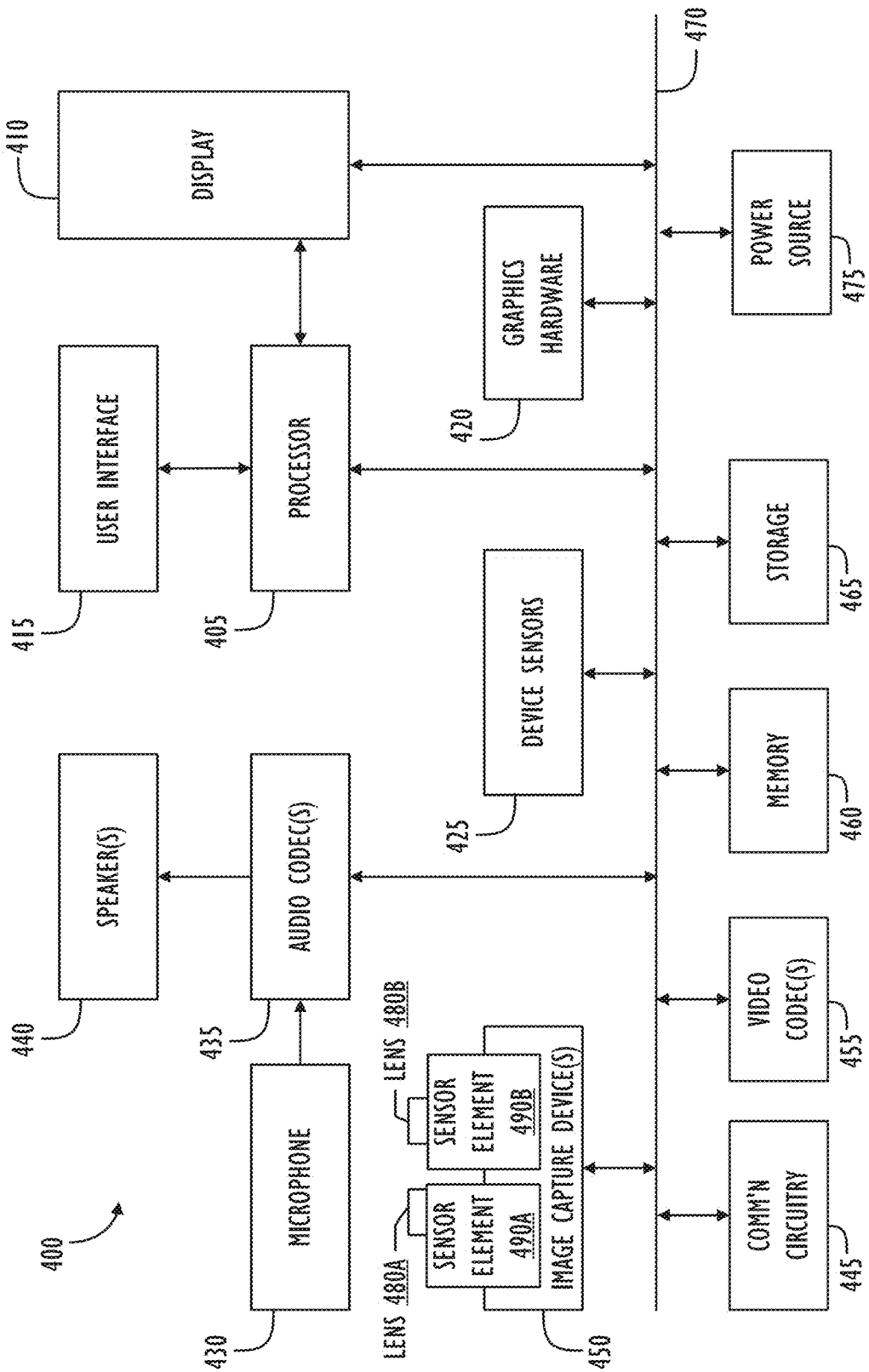
FIG. 4 illustrates an exemplary programmable electronic computing device, according to some aspects.

Turning now to FIG. 4, a functional block diagram of an exemplary programmable electronic computing device 400 is shown according to one embodiment. Electronic device 400 could be, for example, a mobile telephone, personal media device, portable camera, or a tablet, notebook or desktop computer system. As shown, electronic device 400 may include processor 405, display 410, user interface 415, graphics hardware 420, device sensors 425 (e.g., proximity sensor/ambient light sensor, accelerometer, inertial measurement unit, and/or gyroscope), microphone 430, audio codec(s) 435, speaker(s) 440, communications circuitry 445, image capture device(s) 450, which may, e.g., comprise multiple camera units/optical image sensors having different characteristics or abilities (e.g., Still Image Stabilization (SIS), high dynamic range (HDR), optical image stabilization (OIS) systems, optical zoom, digital zoom, etc.), video codec(s) 455, memory 460, storage 465, and communications bus 440.

Processor 405 may execute instructions necessary to carry out or control the operation of many functions performed by electronic device 400 (e.g., such as the generation and/or processing of images in accordance with the various embodiments described herein). Processor 405 may, for instance, drive display 410 and receive user input from user interface 415. User interface 415 can take a variety of forms, such as a button, keypad, dial, a click wheel, keyboard, display screen and/or a touch screen. User interface 415 could, for example, be the conduit through which a user may view a captured video stream and/or indicate particular image frame(s) that the user would like to capture (e.g., by clicking on a physical or virtual button at the moment the desired image frame is being displayed on the device's display screen). In one embodiment, display 410 may display a video stream as it is captured while processor 405 and/or graphics hardware 420 and/or image capture circuitry contemporaneously generate and store the video stream in memory 460 and/or storage 465.

Processor 405 may be a system-on-chip (SOC), such as those found in mobile devices and include one or more dedicated graphics processing units (GPUs). Processor 405 may be based on reduced instruction-set computer (RISC) or complex instruction-set computer (CISC) architectures or any other suitable architecture and may include one or more processing cores. Graphics hardware 420 may be special purpose computational hardware for processing graphics and/or assisting processor 405 perform computational tasks. In one embodiment, graphics hardware 420 may include one or more programmable graphics processing units (GPUs) and/or one or more specialized SOCs, e.g., an SOC specially designed to implement neural network and machine learning operations (e.g., convolutions) in a more energy-efficient manner than either the main device central processing unit (CPU) or a typical GPU, such as Apple's Neural Engine processing cores.

Image capture device(s) 450 may comprise one or more camera units configured to capture images, e.g., images which may be processed to help further calibrate said image capture device in field use, e.g., in accordance with this disclosure. Image capture device(s) 450 may include two (or more) lens assemblies 480A and 480B, where each lens assembly may have a separate focal length. For example, lens assembly 480A may have a shorter focal length relative to the focal length of lens assembly 480B. Each lens assembly may have a separate associated sensor element, e.g., sensor elements 490A/490B. Alternatively, two or more lens assemblies may share a common sensor element. Image capture device(s) 450 may capture still and/or video images. Output from image capture device(s) 450 may be processed, at least in part, by video codec(s) 455 and/or processor 405 and/or graphics hardware 420, and/or a dedicated image processing unit or image signal processor incorporated within image capture device(s) 450. Images so captured may be stored in memory 460 and/or storage 465.

Memory 460 may include one or more different types of media used by processor 405, graphics hardware 420, and image capture device(s) 450 to perform device functions. For example, memory 460 may include memory cache, read-only memory (ROM), and/or random access memory (RAM). Storage 465 may store media (e.g., audio, image and video files), computer program instructions or software, preference information, device profile information, and any other suitable data. Storage 465 may include one more non-transitory storage mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). Memory 460 and storage 465 may be used to retain computer program instructions or code organized into one or more modules and written in any desired computer programming language. When executed by, for example, processor 405, such computer program code may implement one or more of the methods or processes described herein. Power source 475 may comprise a rechargeable battery (e.g., a lithium-ion battery, or the like) or other electrical connection to a power supply, e.g., to a mains power source, that is used to manage and/or provide electrical power to the electronic components and associated circuitry of electronic device 400.

ADDITIONAL COMMENTS

The use of the connective term "and/or" is meant to represent all possible alternatives of the conjunction "and" and the conjunction "or." For example, the sentence "configuration of A and/or B" includes the meaning and of sentences "configuration of A and B" and "configuration of A or B."

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Aspects of the present disclosure may be realized in any of various forms. For example, some aspects may be realized as a computer-implemented method, a computer-readable memory medium, or a computer system. Other aspects may be realized using one or more custom-designed hardware devices such as ASICs. Still other aspects may be realized using one or more programmable hardware elements such as FPGAs.

In some aspects, a non-transitory computer-readable memory medium may be configured so that it stores program instructions and/or data, where the program instructions, if executed by a computer system, cause the computer system to perform a method (e.g., any of a method aspects described herein, or, any combination of the method aspects described herein, or any subset of any of the method aspects described herein, or any combination of such subsets).

Although the aspects above have been described in considerable detail, numerous variations and modifications will become apparent to those skilled in the art once the above disclosure is fully appreciated. It is intended that the following claims be interpreted to embrace all such variations and modifications.

What is claimed is:

1. A method of image processing, comprising:
  obtaining a first image comprising a first plurality of pixels, wherein each pixel in the first plurality of pixels is represented by one or more pixel values;
  obtaining a first segmentation map for the first image, wherein the first segmentation map comprises a first plurality of segmentation values, and wherein each segmentation value in the first plurality of segmentation values represents a degree to which a corresponding pixel in the first plurality of pixels is estimated to be part of a background of the first image;
  performing a histogram analysis on the first plurality of pixels, wherein the histogram analysis is weighted based on each pixel's corresponding segmentation value in the first segmentation map, and wherein the histogram analysis comprises determining at least:
    (a) a median luminance value for pixels estimated to be part of the background of the first image; and
    (b) one or more dominant hues for pixels estimated to be part of the background of the first image; and
  suggesting a first image treatment for the first image based, at least in part, on the determined median luminance value or the determined one or more dominant hues, wherein suggesting the first image treatment for the first image further comprises filtering the pixel values of the first plurality of pixels around the determined one or more dominant hues.

2. The method of claim 1, wherein suggesting the first image treatment for the first image further comprises:
  extracting one or more median luminance values from a red-green-blue (RGB) image histogram constructed based on the filtered pixel values of the first plurality of pixels.

3. The method of claim 2, wherein suggesting the first image treatment for the first image further comprises:
  suggesting a set of complimentary colors for use in an application of the first image treatment, wherein the set of complimentary colors are determined based, at least in part, on the extracted one or more median luminance values from the RGB image histogram.

4. The method of claim 2, wherein suggesting the first image treatment for the first image further comprises:
  suggesting a brightness treatment for the pixels estimated to be part of the background of the first image based, at least in part, on the determined median luminance value for the pixels estimated to be part of the background of the first image.

5. An electronic device, comprising:
  a memory;
  a display; and
  one or more processors operatively coupled to the memory, wherein the one or more processors are configured to execute instructions causing the one or more processors to:
    obtain a first image comprising a first plurality of pixels, wherein each pixel in the first plurality of pixels is represented by one or more pixel values;
    obtain a first segmentation map for the first image, wherein the first segmentation map comprises a first plurality of segmentation values, and wherein each segmentation value in the first plurality of segmentation values represents a degree to which a corresponding pixel in the first plurality of pixels is estimated to be part of a background of the first image;
    perform a histogram analysis on the first plurality of pixels, wherein the histogram analysis is weighted based on each pixel's corresponding segmentation value in the first segmentation map, and wherein the histogram analysis comprises determining at least:
      (a) a median luminance value for pixels estimated to be part of the background of the first image; and
      (b) one or more dominant hues for pixels estimated to be part of the background of the first image; and
    suggest a first image treatment for the first image based, at least in part, on the determined median luminance value or the determined one or more dominant hues, wherein the instructions causing the one or more processors to suggest further comprise instructions causing the one or more processors to filter the pixel values of the first plurality of pixels around the determined one or more dominant hues.

6. The electronic device of claim 5, wherein the instructions causing the one or more processors to suggest the first image treatment for the first image further comprise instructions causing the one or more processors to:
  extract one or more median luminance values from a red-green-blue (RGB) image histogram constructed based on the filtered pixel values of the first plurality of pixels.

7. The electronic device of claim 6, wherein the instructions causing the one or more processors to suggest the first image treatment for the first image further comprise instructions causing the one or more processors to:
  suggest a set of complimentary colors for use in an application of the first image treatment, wherein the set of complimentary colors are determined based, at least in part, on the extracted one or more median luminance values from the RGB image histogram.

8. The electronic device of claim 6, wherein the instructions causing the one or more processors to suggest the first image treatment for the first image further comprise instructions causing the one or more processors to:
  suggest a brightness treatment for the pixels estimated to be part of the background of the first image based, at least in part, on the determined median luminance value for the pixels estimated to be part of the background of the first image.

9. A non-transitory computer readable medium comprising computer readable instructions executable by one or more processors to:

obtain a first image comprising a first plurality of pixels, wherein each pixel in the first plurality of pixels is represented by one or more pixel values;

obtain a first segmentation map for the first image, wherein the first segmentation map comprises a first plurality of segmentation values, and wherein each segmentation value in the first plurality of segmentation values represents a degree to which a corresponding pixel in the first plurality of pixels is estimated to be part of a background of the first image;

perform a histogram analysis on the first plurality of pixels, wherein the histogram analysis is weighted based on each pixel's corresponding segmentation value in the first segmentation map, and wherein the histogram analysis comprises determining at least:
  (a) a median luminance value for pixels estimated to be part of the background of the first image; and
  (b) one or more dominant hues for pixels estimated to be part of the background of the first image; and suggest a first image treatment for the first image based, at least in part, on the determined median luminance value or the determined one or more dominant hues, wherein the instructions executable by one or more processors to suggest further comprise instructions executable by one or more processors to filter the pixel values of the first plurality of pixels around the determined one or more dominant hues.

10. The non-transitory computer readable medium of claim 9, wherein the instructions executable by the one or more processors to suggest the first image treatment for the first image further comprise instructions executable by the one or more processors to:
  extract one or more median luminance values from a red-green-blue (RGB) image histogram constructed based on the filtered pixel values of the first plurality of pixels.

11. The non-transitory computer readable medium of claim 10, wherein the instructions executable by the one or more processors to suggest the first image treatment for the first image further comprise instructions executable by the one or more processors to:
  suggest a set of complimentary colors for use in an application of the first image treatment, wherein the set of complimentary colors are determined based, at least in part, on the extracted one or more median luminance values from the RGB image histogram.

12. The non-transitory computer readable medium of claim 10, wherein the instructions executable by the one or more processors to suggest the first image treatment for the first image further comprise instructions executable by the one or more processors to:
  suggest a brightness treatment for the pixels estimated to be part of the background of the first image based, at least in part, on the determined median luminance value for the pixels estimated to be part of the background of the first image.

* * * * *